Dec. 8, 1953  R. L. HENSON  2,662,126
SEISMOGRAPHIC AMPLIFIER MIXING CIRCUITS
Filed March 23, 1950

INVENTOR.
ROBERT L. HENSON
BY
ATTORNEYS.

Patented Dec. 8, 1953

2,662,126

UNITED STATES PATENT OFFICE 2,662,126

SEISMOGRAPHIC AMPLIFIER MIXING CIRCUITS

Robert L. Henson, Beaumont, Tex., assignor to Sun Oil Company, Philadelphia, Pa., a corporation of New Jersey Application March 23, 1950, Serial No. 151,347

4 Claims. (Cl. 179—171)

This invention relates to mixing circuits for seismographic amplifiers.

In the art of seismographic prospecting, it has long been recognized as desirable that the outputs from various pairs or groups of detectors should be mixed and recording of the mixed signals effected. This is generally effected in the case of the use of an array of detectors arranged in some sequence with respect to the shot point as, for example, in line therewith or in an arcuate array centered about the shot point. It will be evident that, when any such array is used in reflection shooting, the signals from the detectors will, in general, exhibit a progression of their characteristics in the order of the detectors in the array. It is accordingly desirable, for example, to mix the outputs of the first and second detectors, of the second and third detectors, and so on, or, for example, of the first, second, and third detectors, of the second, third and fourth detectors and so on. The mixed signals so obtained tend to balance out characteristics which are due to some accidental placement of properties of a particular detector or its amplifying circuit, and the mixed signals accordingly produce curves in the recorder which are more characteristic of the properties of the earth than would be recorded traces individual to the various detectors. Many times it is desirable to effect the mixing of the signals from the detectors of a group in unequal proportions: for example, if the output of the first, second and third detectors of an array are to be mixed, it may be desirable to provide an output which corresponds to a larger proportion of the signal from the second detector mixed with minor proportions of the signals from the first and third detectors, and so on.

Mixing of the types referred to has heretofore generally been accomplished by what has been called electronic mixing, in which additional tubes, other than those normally involved in amplification have been required with consequent cost, weight and increased battery drains. For example, in one typical electronic mixing circuit four output tubes are required for each detector channel. As a result, such mixing cannot generally be used in portable equipment.

In accordance with the present invention, mixing circuits are provided which are particularly adaptable for use in portable seismographic equipment inasmuch as no additional tubes are required but only groups of small resistors of negligible weight with the result that the apparatus involves no substantial weight or bulk as compared with non-mixing apparatus and no increase of drain on batteries is involved.

In accordance with the invention mixing units may be provided each composed of a proper array of resistors for securing different types and degrees of mixing. While, as will become evident hereafter adjustable resistances could be used, it is generally simpler, and, in fact, advantageous from the standpoint of preventing mistakes in making connections and in determining ultimate results, to supply a number of such arrays which may be readily interchangeable giving rise in each case to a definite type of characteristic.

The general object of the present invention is to secure results of the types indicated. This general object and other objects particularly relating to details of circuit arrangement will be apparent from the following read in conjunction with the accompanying drawing, in which.

The mixing circuits involved in the present invention make use of the principle of feeding the signals from very low impedance sources to very high impedance loads through high resistances.

Figure 1:
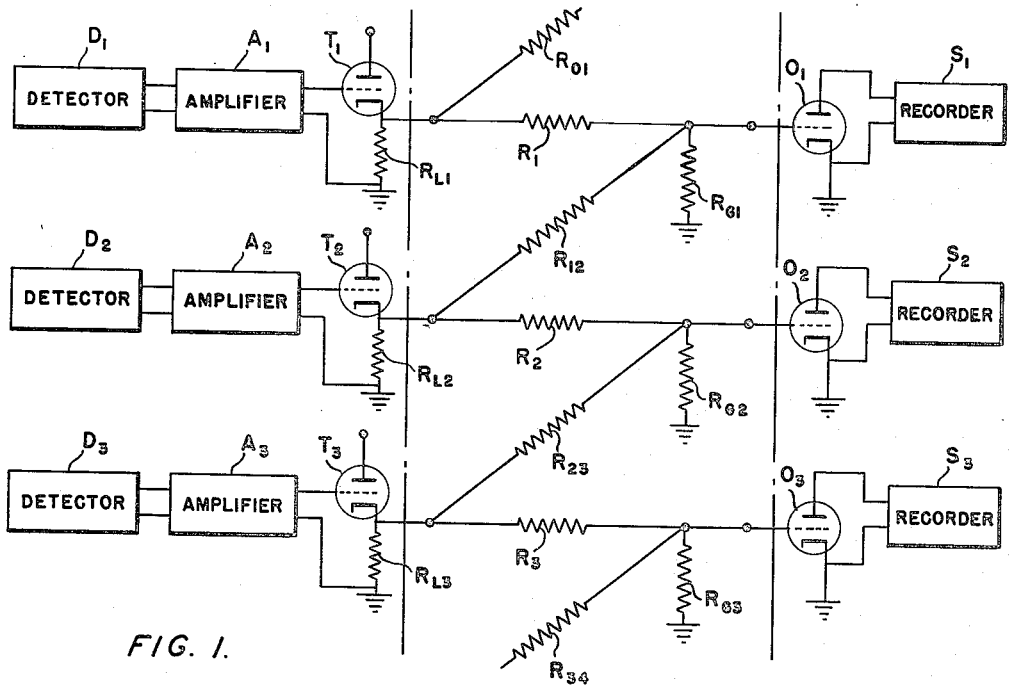
Figure 1 is a diagram of one modification of the invention.

Referring first to Figure 1 there are indicated at $D_1$, $D_2$ and $D_3$ a set of detectors which may be considered as arranged in a serial array, for example, in order in line with a shot point or in an arc around the shot point or otherwise. These detectors which may be of any type commonly used in seismographic prospecting feed their respective signals to amplifiers $A_1$, $A_2$ and $A_3$. These amplifiers may include triodes or other amplifying tubes such as $T_1$, $T_2$ and $T_3$. These tubes may be regarded as the tubes immediately preceding the ordinary output tubes of the amplifiers. The respective output tubes are indicated at $O_1$, $O_2$ and $O_3$ and the outputs therefrom are delivered to the recorder units $S_1$, $S_2$ and $S_3$ which may, for example, be oscillograph elements adapted to record on a single sheet of photographic paper. Generally, while indicated in Figure 1 as separate, the recorders are actually combined in a single multiple channel recorder.

If no mixing were required, the outputs from the tubes T would be connected directly to the inputs of the tubes O. In accordance with the present invention an array of resistors is interposed between these two sets of tubes as will now be described.

The tubes T are connected as cathode followers having cathode load resistors $R_{L1}$, $R_{L2}$ and $R_{L3}$ of relatively low resistance value as will be presently described. The cathodes of the respective tubes T are connected to the grids of the corresponding tubes O through resistors $R_1$, $R_2$ and $R_3$ which resistors have high resistance values. The grids of the tubes O are connected to ground through high resistances indicated at $R_{G1}$, $R_{G2}$ and $R_{G3}$. Between each cathode of a tube T and each grid of a preceding tube O there is connected a resistance such as indicated at $R_{12}$, $R_{23}$, etc. It will be evident that the three channels which are particularly shown in Figure 1 may be associated with preceding and succeeding channels involving for connections such resistances as shown at $R_{01}$, and $R_{34}$.

Assuming for simplicity of description a simple arrangement, consider that the resistances $R_{L1}$, $R_{L2}$ and $R_{L3}$ are five hundred ohms each and that all of the other resistances which are illustrated are 0.5 megohm resistors. A study of the array, taking into account the fact that the cathode load resistors will be negligible in resistance values compared with the other resistances involved, will reveal that applied to the grid for example of tube $O_1$ will be a signal which will consist of a mixture of signals appearing between the cathodes and grounds of the various tubes T. In fact, at the grid of tube $O_1$ there will appear a signal which has one-third the amplitude of the signal appearing at the cathode of tube $T_1$ plus one-third the amplitude of the signal appearing at the cathode of tube $T_2$ plus a signal which is one nine-thousandth of the signal appearing at the cathode of tube $T_3$ plus smaller proportions of signals appearing at the other tubes including a signal which is one nine-thousandth of the amplitude of the signal appearing at the cathode of a tube (not shown) preceding the tube $T_1$. Accordingly, for all practical purposes the signal at the grid of tube $O_1$ involves an equal mixture of the signals appearing at the cathodes of tubes $T_1$ and $T_2$ with a completely negligible proportion of the signals appearing at the cathodes of the other tubes T preceding and succeeding the tubes $T_1$ and $T_2$. Even assuming conditions before the automatic volume control involved in an amplifier takes control of the signal level, it will be evident that at the grid of tube $O_1$ the signals from the tubes other than $T_1$ and $T_2$ will be negligible despite the fact that such signals may well have amplitudes of the order of twenty times the normal values occurring when the automatic volume control becomes effective. This is true because such undesired signals as the maximum have amplitudes which are only one three-thousandth of the amplitudes of the desired signals assuming equal signals. In brief the signals at the grid of tube $O_1$ are for all practical purposes only signals derived from the detectors $D_1$ and $D_2$.

The foregoing, of course, applies to the grids of the other tubes O: for example, the grid of the tube $O_2$ has applied thereto an equal mixture of the signals from the detectors $D_2$ and $D_3$, etc. In short, the outputs to the recorders are respective pairs of detector signals.

While the values specifically mentioned give rise to mixtures of pairs of signals in equal proportions, it will be evident that the proportions of signals of a pair may be caused to take any desired relative values merely by unequal choices of the resistances typified by $R_1$, $R_{12}$ and $R_{G1}$, etc. In this fashion, for example, the grid of the tube $O_2$ may have applied thereto varying proportions of the signals appearing at the cathodes of tubes $T_2$ and $T_3$, etc.

While it will be evident that the resistors involved in an array such as the foregoing may be made adjustable for the purpose of changing the proportions in which the various signals are mixed, this is not generally desirable since, for practical purposes it is better to provide separate arrays if it is desired to change the proportions of mixing. This is practical since the various resistors such as $R_1$, $R_{12}$ and $R_{G1}$, etc. may be very readily combined in a small and compact unit having plug and socket connections for joinder to the tubes of the groups T and O. The resistors involved may be low wattage molded or wire wound resistors, depending upon the accuracies desired, and these are of course are of quite small dimensions and are also quite inexpensive.

Figure 2:
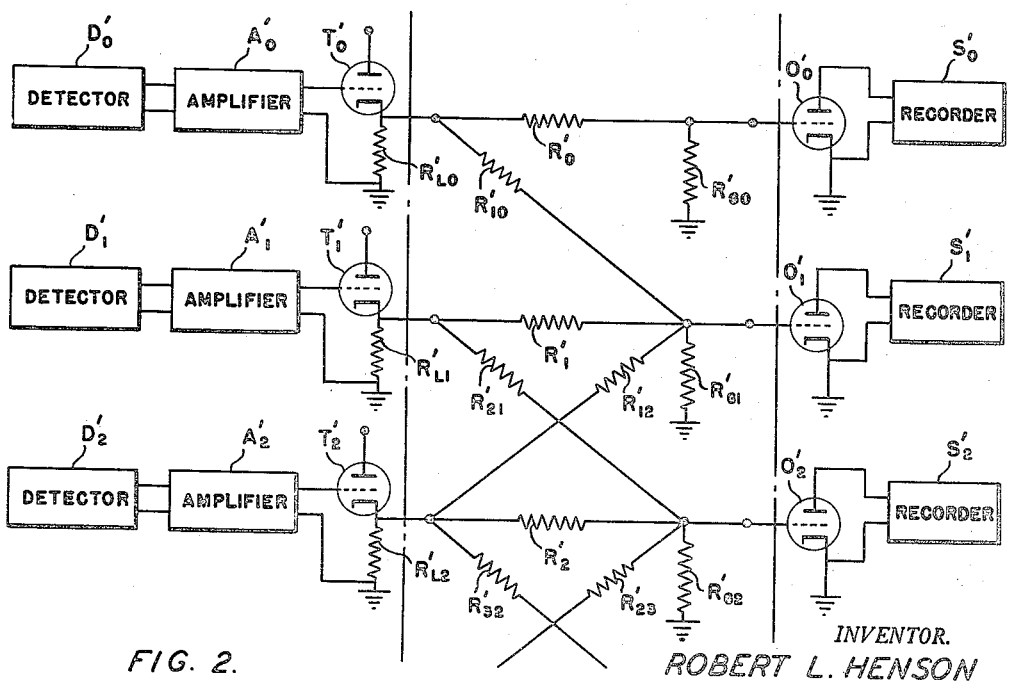
Figure 2 is a similar diagram showing an alternative modification.

While the circuit of Figure 1 is adapted to the mixing of detector signals in pairs in various proportions, as described, the invention may be readily extended to the mixing of signals in groups of three or more. Figure 2 illustrates this last possibility. In this figure the detectors, amplifiers and recorders as well as the tubes T and O have been designated by reference characters corresponding to those of Figure 1 with appended primes. In particular, an end channel is illustrated comprising the detector $D'_0$, amplifier $A'_0$, tube $T'_0$, output tube $O'_0$ and recorder $S'_0$. Cathode load resistors are illustrated at $R'_{L0}$, $R'_{L1}$ and $R'_{L2}$. The cathodes are connected to the grids of corresponding output tubes through resistances $R'_0$, $R'_1$ and $R'_2$ while cross-connections between channels are provided at $R'_{12}$ and $R'_{23}$ as in the modification illustrated in Figure 1. Grid resistances $R'_{G0}$, $R'_{G1}$, and $R'_{G2}$ are also illustrated and correspond to the grid resistances of Figure 1. Additionally, however, there are provided between the channels resistances $R'_{10}$, $R'_{21}$, $R'_{32}$, etc.

Assume now as a typical example that the cathode load resistors have values of 500 ohms each, that the resistances $R'_1$ and $R'_2$ are half megohm resistances, and that the cross-resistances between the channels have values of 1.5 megohms, the grid resistance being half megohm resistances. Under these circumstances, calculation will readily show that at the grid of tube $O'_1$ there will appear a mixture of the signals at the cathodes of the respective tubes $T'_1$, $T'_0$ and $T'_2$ in the proportions of 60%, 20%, and 20%, respectively, with negligible contributions from the other channels. A similar proportioning will appear at the grid of the tube $O'_2$ and other tubes of the channels except those of the end channels. Here again, as in the case of Figure 1, it will be evident that the proportions of the signals mixed together may be varied by proper choices of the resistances in the array.

The mixing system has an advantage over electronic mixing systems in that unmixed signals in the end channels can be made to have the same signal level as the mixed channels by properly adjusting or choosing the series resistors of these end channels. For example, by giving the resistance $R'_0$ the value of 0.3 megohm, consistent with the other resistance values already mentioned, the signal at the grid of the tube $O'_0$ may be made to consist of the signal at the cathode of tube $T'_0$ of the same amplitude as the total amplitude of the mixed signals appearing at the grid of tube $O'_1$, assuming equal cathode signals. At the same time the grid of tube $O'_0$ will have completely negligible components from the channels other than that designated by the subscript 0.

While the triple mixing arrangement illustrated in Figure 2 involves an additional number of resistances, it will be evident that even here the entire resistance array may be kept small and inexpensive so that there is no practical reason for involving the complication of providing adjustable resistances, there being merely substituted different arrays when different proportions of mixing are desired.

It will be evident from the foregoing illustrations of embodiments of the invention that the invention may be carried out in various fashions within the scope of the invention as defined in the following claims.

What is claimed is:

1. A mixing circuit for use in seismographic recording adapted to receive input signals from a plurality of detector channels and to deliver signals to a plurality of recorder channels, said mixing circuit comprising a plurality of cathode-follower elements each including a tube having its cathode associated with a low resistance cathode resistor and each adapted to receive signals from an associated detector channel, a plurality of tubes each having a control grid and adapted to deliver signals to an associated recorder channel, a high resistance connecting the cathode of each of the cathode-follower tubes with the control grid of a corresponding one of the tubes in the recorder channels, and additional high resistances connecting some of the cathodes of the cathode-follower tubes with the control grids of non-corresponding tubes in the recorder channels.

2. A mixing circuit for use in seismographic recording adapted to receive input signals from a plurality of detector channels and to deliver signals to a plurality of recorder channels, said mixing circuit comprising a plurality of cathode-follower elements each including a tube having its cathode associated with a low resistance cathode resistor and each adapted to receive signals from an associated detector channel, a plurality of tubes each having a control grid and adapted to deliver signals to an associated recorder channel, a high resistance connecting the cathode of each of the cathode-follower tubes with the control grid of a corresponding one of the tubes in the recorder channels, and additional high resistances connecting each of some of the cathodes of the cathode-follower tubes with a control grid of a non-corresponding tube in an adjacent recorder channel.

3. A mixing circuit for use in seismographic recording adapted to receive input signals from a plurality of detector channels and to deliver signals to a plurality of recorder channels, said mixing circuit comprising a plurality of cathode-follower elements each including a tube having its cathode associated with a low resistance cathode resistor and each adapted to receive signals from an associated detector channel, a plurality of tubes each having a control grid and adapted to deliver signals to an associated recorder channel, a high resistance connecting the cathode of each of the cathode-follower tubes with the control grid of a corresponding one of the tubes in the recorder channels, additional high resistances connecting some of the cathodes of the cathode-follower tubes with the control grids of non-corresponding tubes in the recorder channels, and high resistance grid resistors connecting the control grids of the tubes in the recorder channels to the ends of the cathode resistors remote from the cathodes with which they are associated.

4. A mixing circuit for use in seismographic recording adapted to receive input signals from a plurality of detector channels and to deliver signals to a plurality of recorder channels, said mixing circuit comprising a plurality of cathode-follower elements each including a tube having its cathode associated with a low resistance cathode resistor and each adapted to receive signals from an associated detector channel, a plurality of tubes each having a control grid and adapted to deliver signals to an associated recorder channel, a high resistance connecting the cathode of each of the cathode-follower tubes with the control grid of a corresponding one of the tubes in the recorder channels, additional high resistances connecting each of some of the cathodes of the cathode-follower tubes with a control grid of a non-corresponding tube in an adjacent recorder channel, and high resistance grid resistors connecting the control grids of the tubes in the recorder channels to the ends of the cathode resistors remote from the cathodes with which they are associated.

ROBERT L. HENSON.

References Cited in the file of this patent

UNITED STATES PATENTS

| Number | Name | Date |
|---|---|---|
| 2,180,949 | Blau et al. | Nov. 21, 1939 |
| 2,257,859 | Rosaire | Oct. 7, 1941 |
| 2,360,507 | Minton | Oct. 17, 1944 |
| 2,364,755 | Ritzmann | Dec. 12, 1944 |
| 2,431,600 | Wolf | Nov. 25, 1947 |
| 2,509,651 | Olson | May 30, 1950 |